(12) United States Patent
Yamauchi et al.

(10) Patent No.: US 8,000,443 B2
(45) Date of Patent: Aug. 16, 2011

(54) HIGH PRECISION POSTURE CONTROL METHOD OF X-RAY MIRROR

(75) Inventors: Kazuto Yamauchi, Suita (JP); Hidekazu Mimura, Suita (JP); Hiromi Okada, Kobe (JP)

(73) Assignees: JTEC Corporation, Kobe-Shi (JP); Osaka University, Suita-Shi (JP)

( * ) Notice: Subject to any disclaimer, the term of this patent is extended or adjusted under 35 U.S.C. 154(b) by 162 days.

(21) Appl. No.: 12/374,137

(22) PCT Filed: Jul. 17, 2007

(86) PCT No.: PCT/JP2007/064098
§ 371 (c)(1),
(2), (4) Date: Jan. 16, 2009

(87) PCT Pub. No.: WO2008/010491
PCT Pub. Date: Jan. 24, 2008

(65) Prior Publication Data
US 2010/0002838 A1    Jan. 7, 2010

(30) Foreign Application Priority Data

Jul. 18, 2006  (JP) ................ 2006-221714

(51) Int. Cl.
*G21K 1/08* (2006.01)
*G02B 5/08* (2006.01)
*G02B 7/182* (2006.01)
(52) U.S. Cl. ............. 378/84; 378/85; 359/851; 359/855
(58) Field of Classification Search ................ 378/84, 378/85, 162, 204, 205, 206, 210; 359/201.2, 359/439, 457, 741, 742, 827–877
See application file for complete search history.

(56) References Cited

U.S. PATENT DOCUMENTS

| | | | | |
|---|---|---|---|---|
| 3,772,464 A | * | 11/1973 | Chan et al. | 348/203 |
| 5,272,570 A | * | 12/1993 | Yoshida et al. | 359/853 |
| 7,646,849 B2 | * | 1/2010 | Iwasaki et al. | 378/86 |
| 2003/0112923 A1 | * | 6/2003 | Lange et al. | 378/147 |

FOREIGN PATENT DOCUMENTS

| | | |
|---|---|---|
| JP | 4-45417 | 2/1992 |
| JP | 7-253528 | 10/1995 |
| JP | 8-271697 | 10/1996 |

OTHER PUBLICATIONS

International Search Report for International Application No. PCT/JP2007/064098 dated Aug. 14, 2007.

* cited by examiner

*Primary Examiner* — Anastasia Midkiff
(74) *Attorney, Agent, or Firm* — Kratz, Quintos & Hanson, LLP (57) ABSTRACT

A high precision posture control method for sustaining the posture of an X-ray optical element constantly at 1 μrad or less. A longitudinal condensation mirror and a lateral condensation mirror, each having a condensation plane band consisting of an elliptical reflective surface, are arranged perpendicularly to each other to form a K-B mirror arrangement. Fresnel mirrors are respectively constituted of a pair of planar reflective surfaces formed in the vicinities of the incident side end and the exit side end of the condensation plane band of each condensation mirror. Interference fringe by the Fresnel mirror of each condensation mirror is independently monitored at a position insusceptible to a condensation beam by the condensation plane band, and variation in interference fringe is detected electrically and its detection signal is used as a feedback signal for posture control of each condensation mirror.

13 Claims, 5 Drawing Sheets

HIGH PRECISION POSTURE CONTROL METHOD OF X-RAY MIRROR

TECHNICAL FIELD

The present invention relates to a high precision posture control method of an X-ray mirror, more specifically to a high precision posture control method of an X-ray mirror for collecting X-rays, from hard X-rays to soft X-rays, used in radiation light facilities, for example, at a high spatial resolution with a light collection spot of 100 nm or less.

BACKGROUND ART

X-rays with characteristics of high brightness, low emittance and high coherence have become available in various wavelength ranges covering from soft X-rays to hard X-rays in third-generation radiation light facilities as typified by SPring-8. This has dramatically enhanced diverse analysis sensitivities and spatial resolutions in fluorescent X-ray analysis, photoelectron spectroscopic analysis, X-ray diffraction and the like. X-ray analysis and X-ray microscopic methods using such radiation light offer high sensitivities and resolutions and allow nondestructive observations, and therefore are currently being used in the fields of medicine, biology, material science and the like.

To add high spatial resolutions to various analysis techniques used with X-rays in radiation facilities, it is needed to collect X-ray nanobeams. In X-ray nanobeam formation, a reflective mirror is regarded as a most excellent light collection optical element, for the reason that there is no brightness or chromatic aberration. Generally used as a light collection optical system with a reflective mirror is a Kirkpatrick and Baez (K-B) mirror (refer to Patent Document 1). A K-B mirror arrangement is constituted by two full-reflective mirrors which have ellipsoidal forms with focal points at a light source and a collection point and collect light in vertical and horizontal directions, respectively.

A reflective mirror collects X-rays from a light source at a point by fully reflecting the X-rays or reflecting the X-rays with a multilayer film. To maintain a best light collection state, it is necessary to make constant an angle between incident X-rays and a mirror (incident angle), which would be changed due to temperature drifts. Most observations using radiation light require long-duration measurements, and it is therefore imperative to keep collected beams in a uniform state in an X-ray microscope using a light collection optical system with an X-ray mirror. This issue has been handled so far only by maintaining uniform temperature environments, which is deemed to be a major drawback in light collection optical systems using an X-ray mirror. A light collection method using an X-ray mirror has not been recognized to be suitable for long-duration observations due to this drawback, although in principle, this method is superior in aperture size and efficiency to other light collection methods using diffraction or refraction.

Patent Document 1: Japanese Unexamined Patent Publication No.

DISCLOSURE OF THE INVENTION

Technical Problems to be Solved

As stated above, for implementing high-resolution X-ray microscopes or performing high-precision measurements with X-rays, it is important in light collection with a reflective mirror to perform properly initial alignment of the mirror and maintain a best light collection state. For example, to allow a mirror to collect 15-keV X-rays at a level of 100 nm or less in a K-B mirror arrangement, it is necessary to maintain an incident angle constant at 1 μrad or less.

Accordingly, in light of the foregoing circumstances, an object of the present invention is to provide a high precision posture control method of an X-ray mirror by which a posture of an ultrahigh precision X-ray mirror or X-ray optical element for collecting X-rays, from hard X-rays to soft X-rays, or changing a light path of X-rays, can be kept constant, particularly an incident angle of X-rays can be kept constant at 1 μrad or less.

Means to Solve the Problems

For solving the foregoing problem, the present invention implements a high precision posture control method of an X-ray mirror for collecting X-rays, from hard X-rays to soft X-rays, at a high spatial resolution with a light collection spot of 100 nm or less, wherein: a longitudinal light collection mirror and a lateral light collection mirror, which include light collection surface zones formed of ellipsoidal reflective surfaces with focal points at a light source and a light collection surface, are orthogonal to each other in a K-B mirror arrangement; a pair of planar reflective surfaces constitutes an Fresnel mirror in the vicinities of an incident-side end and an outgoing-side end of the light collection surface zone in each of the light collection mirrors; interference fringes resulting from the Fresnel mirrors in the light collection mirrors are separately monitored at positions which are not influenced by beams collected at the light collection surface zones; and changes in the interference fringes are electrically detected, and detection signals are used as feedback signals for posture control of the light collection mirrors (Claim 1).

In this arrangement, in response to detection signals from the Fresnel mirrors provided at the longitudinal light collection mirror and lateral light collection mirror, pulse-driven motors or actuators for incident angle regulation are controlled (Claim 2).

In addition, preferably, interference fringes resulting from the Fresnel mirrors are monitored by an imaging camera sensitive to target X-rays, an interference fringe at a smallest light collection spot is set as reference image data, and a detection signal is generated from a comparison between the reference image data and current sequential image data (Claim 3).

Further, preferably, interference fringes resulting from the Fresnel mirrors are monitored by an imaging camera sensitive to target X-rays, an interference fringe at a smallest light collection spot is set as reference image data, a change in sequential image data is detected with respect to the reference image data, and a pulse signal for driving the motors or actuators is generated until the sequential image data conforms to the reference image data in an allowable range (Claim 4).

In this arrangement, the imaging camera is preferably a CCD camera (Claim 5). Alternatively, the imaging camera is preferably an X-ray detector with a combination of a pinhole and a photo diode (Claim 6).

Moreover, the present invention implements a high precision posture control method of an X-ray mirror for collecting X-rays, from hard X-rays to soft X-rays, or changing a light path thereof by reflecting the X-rays on a strip-shaped reflective surface zone, wherein: a pair of planar reflective surfaces constitutes a Fresnel mirror in the vicinities of an incident-side end and an outgoing-side end of the reflective surface zone in the X-ray mirror; an interference fringe resulting from the Fresnel mirror is monitored at a position which is not influenced by X-ray beams reflected on the reflective surface zone; a change in the interference fringe is electrically detected; and a detection signal is used as a feedback signal for posture control of the X-ray mirror (Claim 7).

Further, the present invention provides an X-ray mirror that allows high precision posture control for collecting X-rays, from hard X-rays to soft X-rays, or changing a light path thereof by reflecting the X-rays, wherein a strip-shaped reflective surface zone is formed in a longitudinal direction, and a pair of planar reflective surfaces constitutes an Fresnel mirror in the vicinities of an incident-side end and an outgoing-side end of the reflective surface zone (Claim 8).

Effect of the Invention

In the high precision posture control method of an X-ray mirror in the present invention configured as above, an X-ray mirror for collecting or reflecting X-rays, from hard X-rays to soft X-rays, includes a light collection surface zone and a reflective surface zone which perform original functions of the X-ray mirror, and an Fresnel mirror is constituted by a pair of planar reflective surfaces in the vicinities of an incident-side end and an outgoing-side end. Accordingly, X-rays emitted from the same light source are collected or reflected, and also reflected on the pair of planar reflective surfaces constituting the Fresnel mirror, a resulting Fresnel interference fringe is monitored, a change in the interference fringe is electrically detected, and a detection signal is used as a feedback signal for posture control of the X-ray mirror. As a result, the posture of the X-ray mirror can be controlled with high precision. Moreover, the present invention also makes it possible to monitor and correct the posture of the X-ray mirror with a high precision of 1 μrad or less in real time while using the original functions of the X-ray mirror.

BEST MODE FOR CARRYING OUT THE INVENTION

Figure 1:
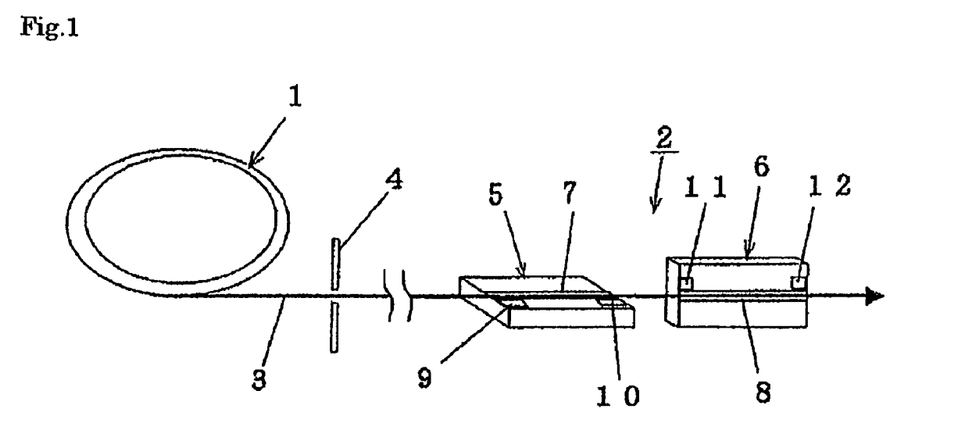
FIG. 1 is a schematic diagram of an X-ray light collector to which the present invention is applied.

First, a detailed description will be given as to an embodiment to which the high precision posture control method of an X-ray mirror in the present invention is suitably applied, with reference to the drawings. FIG. 1 is a schematic view of a light collection optical system in which X-rays produced by a radiation light generator 1 such as SPring-8 or a free electron laser are collected by an X-ray light collector 2 with a K-B mirror arrangement. In this configuration, X-ray beams 3 produced by the radiation light generator 1 are passed through a slit 4, and then collected at the X-ray light collector 2 with the K-B mirror arrangement in which a longitudinal light collection mirror 5 and a lateral light collection mirror 6 with ellipsoidal reflective surfaces are orthogonal to each other.

The longitudinal light collection mirror 5 and the lateral light collection mirror 6 are produced by processing Si single-crystal blocks with nanometer-level form accuracy, forming in middle portions thereof light collection surface zones 7 and 8 which include ellipsoidal reflective surfaces with focal points at a light source and a light collection point, respectively, and coating the reflective surfaces with Pt 50 nm thick, so as to have an optical characteristic of collecting 15-keV X-rays at a large incident angle of 4 mrad. For example, the longitudinal light collection mirror 5 and the lateral light collection mirror 6 are 100 mm long and have a relatively long operating distance of 100 mm in consideration of practical use in X-ray microscopes, to thereby achieve a light collection spot of 50 nm or less in diffraction-limited light collection.

In mirror alignment of the X-ray light collector 2, out of axes to be considered, an incident angle means an angle of a mirror surface with respect to incident X-rays at a center of the mirror, and in-plane rotation refers to rotation around a normal vector at the center of the mirror. In addition, an inter-mirror orthogonality is expressed by a value that is obtained by defining normal vectors around the two mirrors and subtracting 90° from an angle formed by the two axes.

A ray-trace simulator was used to estimate an incident angle, inter-mirror orthogonality and allowable angle margin in in-plane rotation. The allowable angle margin was calculated with the ray-trace simulator as described below. First, a beam size to be defined by a first inter-local minimum point distance in diffraction limits, was calculated by an equation as follows:

$$d = 2.0 \lambda f/D$$

In this equation, d denotes a first inter-local minimum point distance in a diffracted wave on the basis of a rectangular aperture, λ a wave length of an X-ray, f a focal distance, and D a mirror aperture.

Next, a ray-trace simulator was used to calculate a relationship between an angle margin and a spot size defined by a maximum breadth. In this calculation, the allowable angle margin was defined to be within a range in which the spot size obtained by the ray-trace simulator is determined to be d or less from the above equation. The above calculation has revealed that precision required for incident angle alignment was ±0.7 μrad at the longitudinal light collection mirror 5 and ±0.3 μrad at the lateral light collection mirror 6. The allowable angle range was determined to be ±40 μrad in relation to the inter-mirror orthogonality. In addition, it has been found that the allowable angle range in in-plane rotation was ±13 mrad at the longitudinal light collection mirror 5 and ±16 mrad at the lateral light collection mirror 6, which means that there was hardly need to take in-plane rotation into account.

It is expected that the allowable angle margin estimated by the ray-trace simulator will be more rigorous than in actual in the vicinities of the diffraction limits. Therefore, the incident angle requiring extremely strict alignment precision is to be stringently calculated in a wave-optical simulation. Since the ray-trace simulator approximates a wavelength to infinitesimal, it is impossible to strictly discuss collected beams in the vicinities of the diffraction limits in this method. In contrast to that, the wave-optical simulation uses a new simulator that can determine an intensity distribution profile of reflected beams by calculating Fresnel-Kirchhoffs diffraction integral. Assuming that, as result of the wave-optical simulation, a relationship between an incident angle margin and a diameter of light collection represented by FWHM is obtained and the allowable incident angle margin is defined to be within an angle range in which a minimum spot size obtained under ideal conditions (ideal mirrors and ideal mirror alignment) expands up to 120%, it has been found that the allowable incident angle margin was ±1.5 μrad at the longitudinal light collection mirror 5 and ±0.9 μrad at the lateral light collection mirror 6.

Therefore, in the X-ray light collector 2, highest-precision adjustment is needed to an incident angle of the X-ray mirrors, followed by inter-X-ray mirror orthogonality, and thus both of the incident angle and orthogonality need high-precision alignment. As stated above, the X-ray mirrors need to be aligned in incident angle with a high precision of 1 μrad or less and kept in posture. The present invention thus provides a method for controlling an incident angle of an X-ray mirror with high precision.

Light collection state is susceptible to an incident angle of radiated X-rays with respect to a mirror, and thus the mirror needs to be stabilized in posture at a 1-µrad level with respect to an optical axis. Proposed herein is a composite mirror in which small-sized Fresnel mirrors are incorporated into two portions of an X-ray mirror with an ellipsoidal form. In FIG. 1, a pair of planar reflective surfaces 9 and 10 is formed in the vicinities of the incident-side end and outgoing-side end of a light collection surface zone 7 in the middle portion of the longitudinal light collection mirror 5 to thereby constitute a Fresnel mirror. The Fresnel mirror is also called Fresnel's double mirror. Similarly, a pair of planar reflective surfaces 11 and 12 is formed in the vicinities of the incident-side end and outgoing-side end of a light collection surface zone 8 in the middle portion of the lateral light collection mirror 6 to thereby constitute a Fresnel mirror.

A Fresnel mirror refers to a pair of planar mirrors with different incident angles, which can generate an interference fringe. A destination of a reflected beam is changed with a change in incident angle, and therefore the change may be monitored. However, at a $1 \times 10^{-7}$ rad level, such a change will amount to only several hundred nm even at a distance of several meters, and thus it is impossible to monitor a beam position due to limitations of CCD resolution and temperature drifts in a detector Meanwhile, a Fresnel interference fringe changes in position at a 10-µm level with a change in angle of 0.1 µrad, and therefore it is possible to monitor a change in Fresnel interference fringe, read and feed back positional information.

Figure 2:
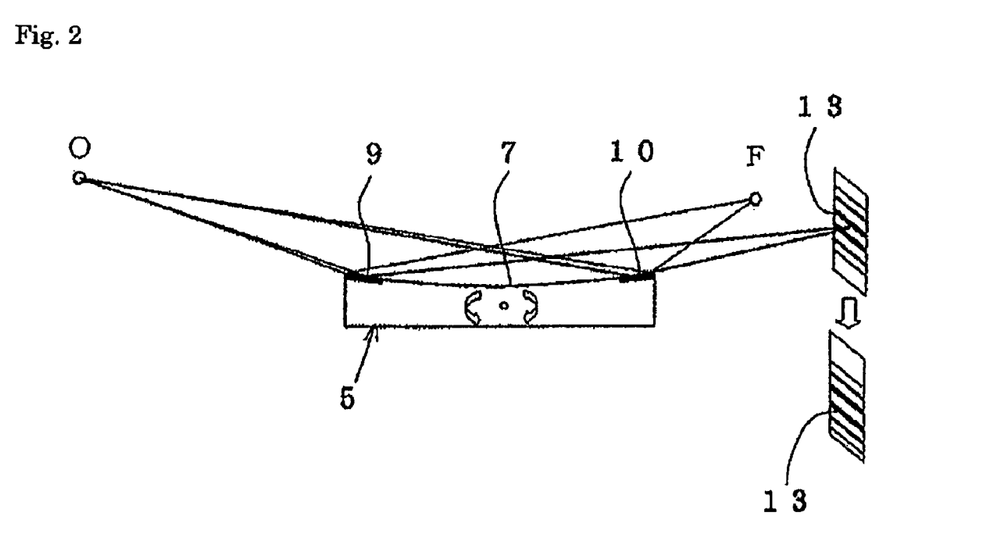
FIG. 2 is an illustrative diagram for describing a principle of the present invention.

FIG. 2 illustrates a principle of the present invention on the basis of the longitudinal light collection mirror 5. X-ray beams emitted from an X-ray light source O are collected at a focal point F by the ellipsoidal light collection surface zone 7. At the same time, the X-ray beams emitted from the X-ray light source O are reflected on the pair of planar reflective surfaces 9 and 10 constituting a Fresnel mirror, and then a Fresnel interference fringe 13 is generated at a position where the X-rays reflected on both of the planar reflective surfaces 9 and 10 intersect. The Fresnel interference fringe 13 is monitored, and a change in the interference fringe is electrically detected, and a detection signal is used as a feedback signal for posture control of the light collection mirror.

Figure 3:
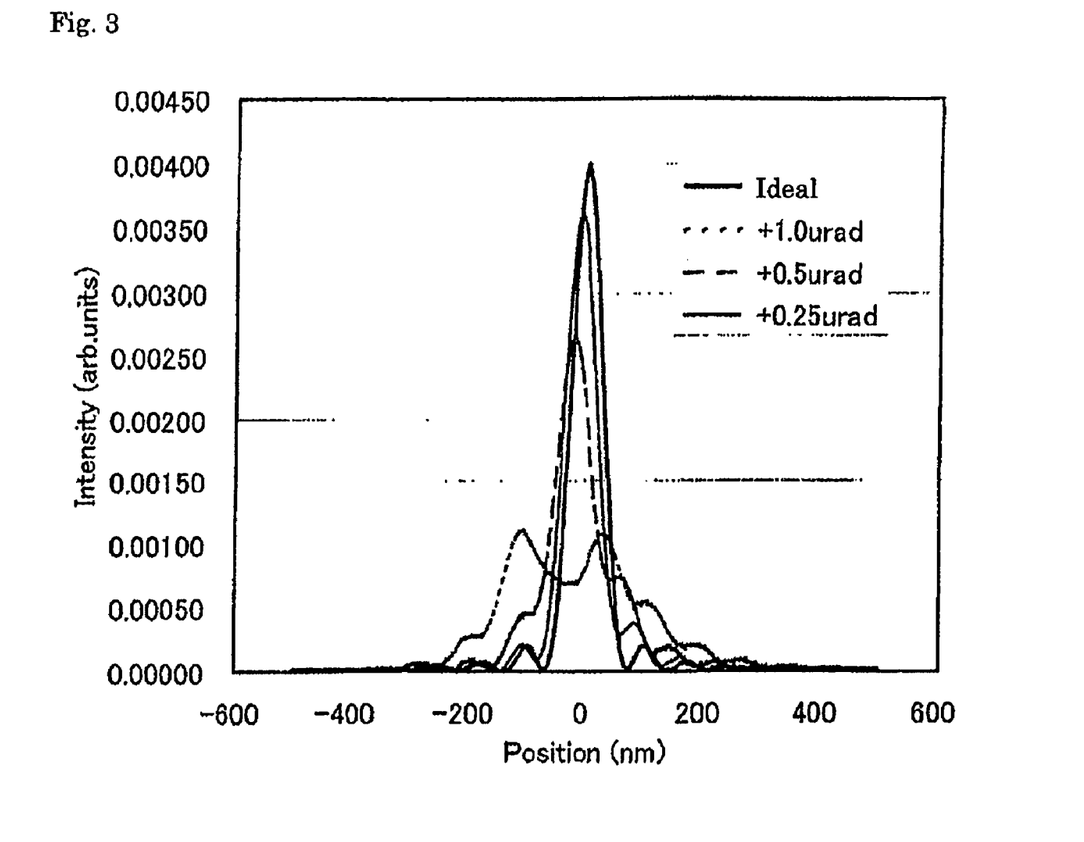
FIG. 3 is a graph showing a relationship between an incident angle and a light collection profile of X-rays.
Figure 4:
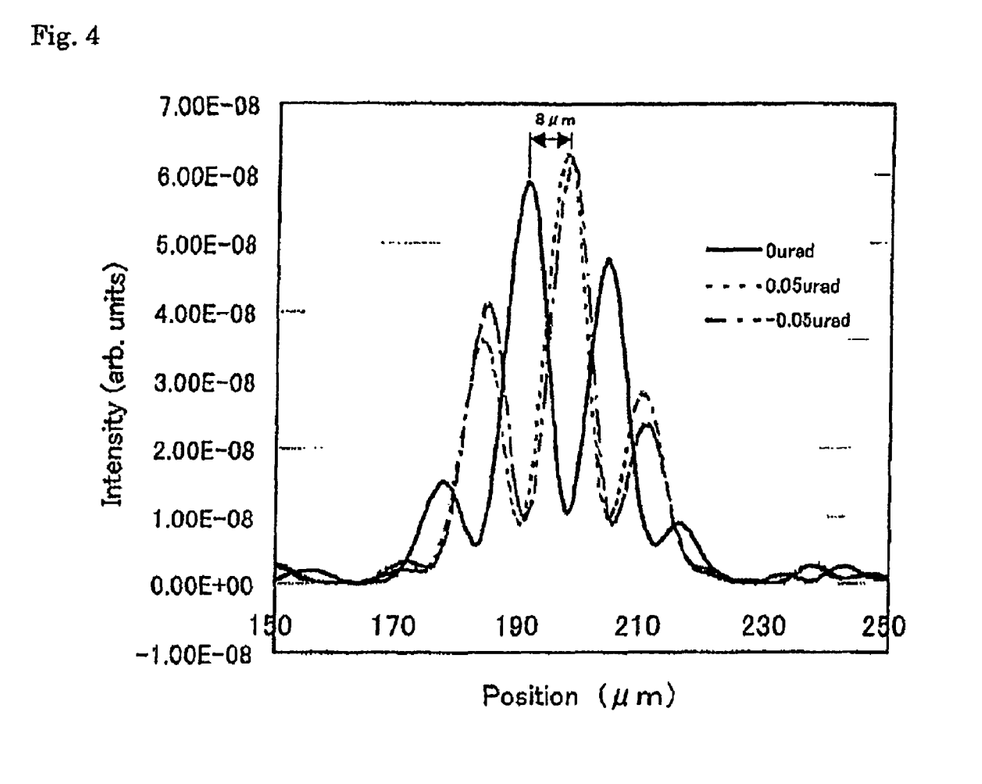
FIG. 4 is a graph showing a relationship between a Fresnel interference fringe and an incident angle.

FIG. 3 shows a relationship between an incident angle and an intensity profile. From the figure, it can be understood that a peak value becomes ⅔ with a deviation of 0.5 µrad from an ideal incident angle and that a collected beam profile is greatly collapsed in shape with a change in angle at a 1-µrad level. Meanwhile, FIG. 4 shows changes in Fresnel interference fringe and incident angle. In a model used for calculations shown in the figures, an X-ray mirror (the longitudinal light collection mirror 5) is 400 mm long, a spacing between the incident-side planar reflective surface 9 and the outgoing-side reflective surface 10, both of which are 10-mm squares, is 380 mm, angles of both of the reflective surfaces (an angle of Fresnel mirror) are 3 µrad, and an incident angle of X-rays is 1 mrad. In this design, it can be understood that there is a positional change of 8 µm only with an angle change of 0.05 µrad.

Figure 5:
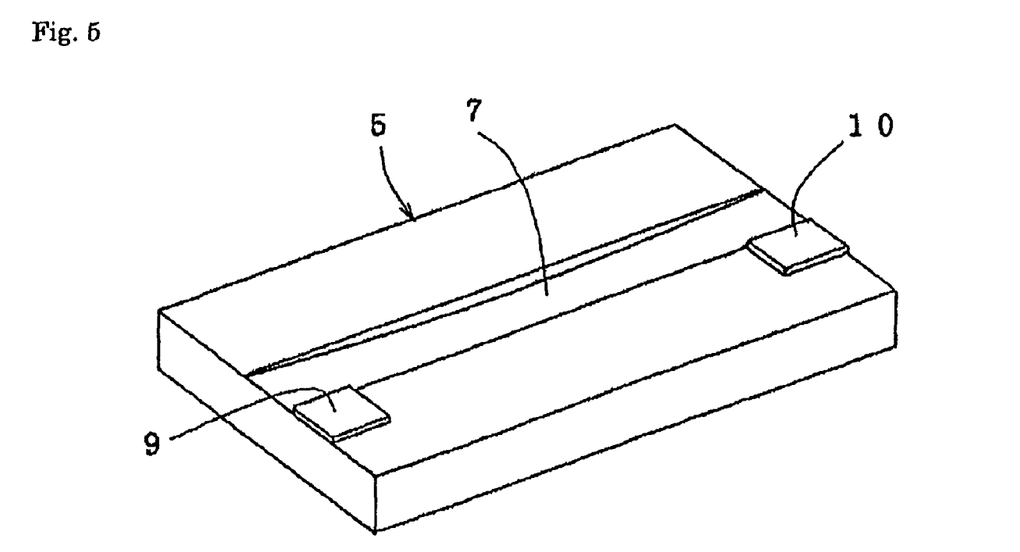
FIG. 5 is a perspective view of an X-ray mirror of the present invention.

FIG. 5 is a schematic view of an X-ray mirror according to the present invention, illustrating the longitudinal light collection mirror 5 as an example. This X-ray mirror is produced by forming the light collection surface zone 7 in a desired shape such as an ellipsoid in a middle portion of a Si single-crystal block with nano-level form accuracy. In addition, the pair of planar reflective surfaces 9 and 10 with a minute angle difference therebetween is formed in the vicinities of the incident-side end and outgoing-side end of the light collection surface zone 7, and both of the planar reflective surfaces 9 and 10 constitute a Fresnel mirror. A Fresnel interference fringe appears in parallel to a line of intersection of the planar reflective surfaces 9 and 10. Although the light collection surface zone 7 is of an ellipsoidal shape in this embodiment, the light collection surface zone 7 may be a cylindrical, paraboloidal, planar or any other optical functional surface. In any case, with the Fresnel mirror integrally formed in the X-ray mirror, it is possible to monitor an angle of the X-ray mirror and control a posture of the same.

In this embodiment, an X-ray mirror is shown as a typical example of an X-ray optical element, and further a K-B mirror is shown as a typical example of an X-ray mirror. It is obvious that a technical idea of the present invention of monitoring an interference fringe resulting from a Fresnel mirror integrally formed in an X-ray mirror to thereby control a posture of the X-ray mirror with high precision is not limited to X-ray mirrors but applicable to a wide variety of X-ray optical elements. That is, the light collection surface zone 7 may be a strip-shaped reflective surface zone, may be a simple reflective surface zone which reflects X-rays only for changing a light path, or may be of a convex shape for diffusing or expanding X-rays. In addition, the light collection surface zone 7 or a reflective surface of a reflective surface zone may be a full-reflective surface or multilayer film. In the present invention, the light collection surface zone 7 and the reflective surface zone are strip-shaped because X-ray beams are favorably converged in this arrangement and thus the above zones need no high-precision processing.

Figure 6:
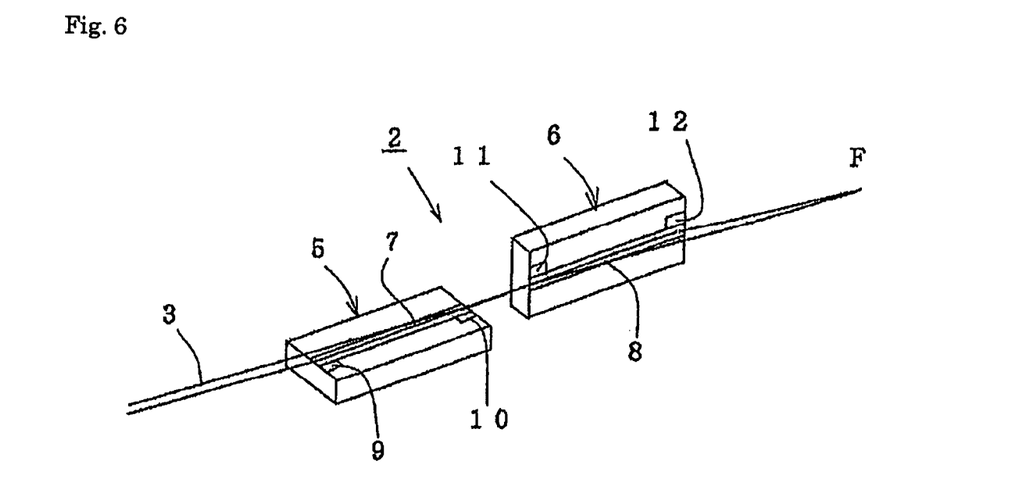
FIG. 6 is a simplified perspective view of a light collection optical system with a K-B mirror arrangement.

Then, a description will be given as to an embodiment in which the present invention is applied to a K-B mirror arrangement, with reference to FIGS. 6 to 9. The X-ray light collector 2 with a K-B mirror arrangement, as shown in FIG. 6, reflects the incident X-ray beams 3 on the light collection surface zone 7 of the longitudinal light collection mirror 5 to thereby collect the beams in a longitudinal direction, reflects the beams on the light collection surface zone 8 of the lateral light collection mirror 6 to thereby collect the beams in a lateral direction, and then collects the beams at the focal point F common to the longitudinal light collection mirror 5 and the lateral light collection mirror 6.

Figure 7:
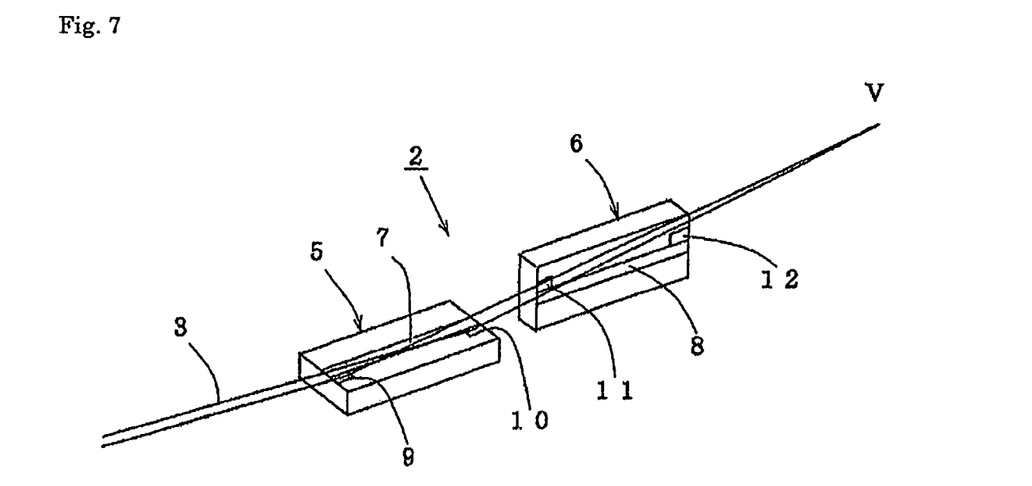
FIG. 7 is a simplified perspective view of a longitudinal Fresnel mirror interference optical system.
Figure 8:
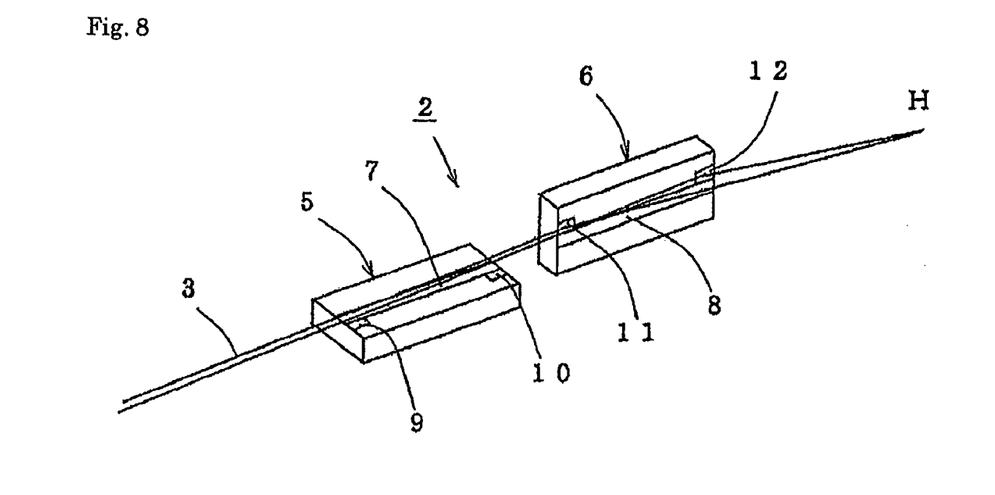
FIG. 8 is a simplified perspective view of a lateral Fresnel mirror interference optical system.

Then, in parallel with the above collection of the X-rays in the K-B mirror arrangement, Fresnel fringes generated by the Fresnel mirrors incorporated into the longitudinal light collection mirror 5 and the lateral light collection mirror 6 are monitored, as shown in FIGS. 7 and 8. The above is based on the assumption that the incident X-ray beam 3 with a certain spread enters the mirror, and a small or large portion of the beam reflects on the light collection surface zone 7 of the longitudinal light collection mirror 5, and the other portion goes off the light collection surface zone 7 and enters a side thereof. That is, as shown in FIG. 7, the X-ray beam 3 also enters the pair of planar reflective surfaces 9 and 10 in the vicinities of the incident-side end and outgoing-side end of the light collection surface zone 7 in the longitudinal light collection mirror 5. Since the pair of planar reflective surfaces 9 and 10 constitutes a Fresnel mirror, the X-rays reflected on these reflective surfaces intersect at an intersection point V shown in the figure, and a Fresnel interference fringe is generated at this position.

Similarly, as shown in FIG. 8, the X-ray beam 3 also enters directly the pair of planar reflective surfaces 11 and 12 in the vicinities of the incident-side end and outgoing-side end of the light collection surface zone 8 in the lateral light collection mirror 6. Since the pair of planar reflective surfaces 11 and 12 constitutes a Fresnel mirror, the X-rays reflected on these reflective surfaces intersect at an intersection point H shown in the figure, and a Fresnel interference fringe is generated at this position.

Figure 9:
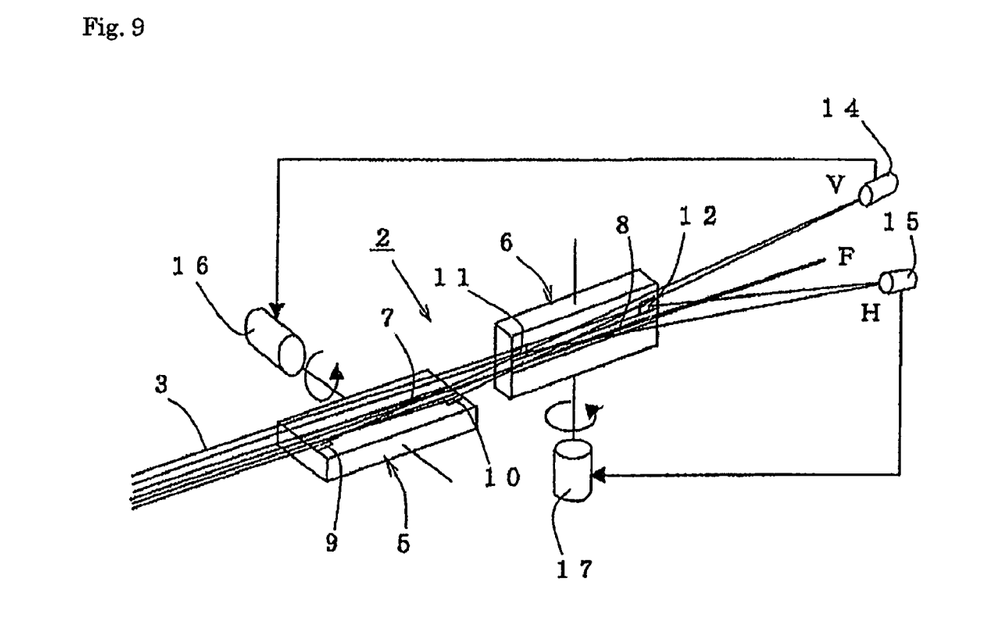
FIG. 9 is an overall simplified perspective view describing a concept of posture control of an X-ray mirror in the present invention.

Then, as shown in FIG. 9, an imaging camera 14 sensitive to target X-rays is disposed at the intersection point V, and an imaging camera 15 sensitive to X-rays is disposed at the intersection point H. The intersection point V spreads in a direction of an optical axis according to the sizes of the planar reflective surfaces 9 and 10. The same applies to the intersection point H. In actuality, the imaging cameras 14 and 15 are CCD cameras which are disposed behind X-ray detection plates orthogonal to optical axes in the vicinities of the intersection points V and H, and acquire images, as electronic image data, which are affected by intensity distributions of X-rays from the detection plates. Then, a change in Fresnel interference fringe is electrically detected, a detection signal is used as a feedback signal for posture control of the light collection mirrors, and the pulse-driven motors or actuators 16 and 17 for regulation of incident angles of the longitudinal light collection mirror 5 and lateral light collection mirror 6 are controlled to thereby regulate the incident angles with a precision of 1 μrad or less. In addition, X-ray detectors with a combination of a pinholes and a photo diode may be used as the imaging cameras 14 and 15 to acquire image data.

Specifically, Fresnel interference fringes resulting from the Fresnel mirrors are monitored by the imaging cameras 14 and 15, an interference fringe with the smallest light collection spot is set as reference image data, and a detection signal is generated through a comparison between the reference image data and current sequential image data. More specifically, a change in the sequential image data is detected with respect to the reference image data, and a pulse signal for driving the motors or actuators 16, 17 is generated until the sequential image data conforms to the reference image data in an allowable range, to thereby keep best postures of the longitudinal light collection mirror 5 and lateral light collection mirror 6.

BRIEF DESCRIPTION OF NUMERALS

1 Radiation light generator
2 Line light collector
3 X-ray beam
4 Slit
5 Longitudinal light collection mirror
6 Lateral light collection mirror
7 Light collection surface zone
8 Light collection surface zone
9 Incident-side planar reflective surface
10 Outgoing-side planar reflective surface
11 Incident-side planar reflective surface
12 Outgoing-side planar reflective surface
13 Fresnel interference fringe
14 Imaging camera
15 Imaging camera
16 Motor or actuator
17 Motor or actuator
O X-ray light source
F Focal point
H Intersection
V Intersection

The invention claimed is:

1. A high precision posture control method of an X-ray mirror for collecting X-rays, from hard X-rays to soft X-rays, at a high spatial resolution with a light collection spot of 100 nm or less, said method comprising steps of: providing a longitudinal light collection mirror and a lateral light collection mirror, which include light collection surface zones formed of ellipsoidal reflective surfaces with focal points at a light source and a light collection surface; said mirrors being oriented orthogonal to each other in a K-B mirror arrangement; providing a pair of planar reflective surfaces constituting a Fresnel mirror in the vicinities of an incident-side end and an outgoing-side end of the light collection surface zone in each of the light collection mirrors; separately monitoring interference fringes resulting from the Fresnel mirrors in the light collection mirrors at positions which are not influenced by beams collected at the light collection surface zones; electrically detecting changes in the interference fringes; and using detection signals as feedback signals for posture control of the light collection mirrors.

2. The high precision posture control method of an X-ray mirror according to claim 1, wherein, in response to detection signals from the Fresnel mirrors provided at the longitudinal light collection mirror and lateral light collection mirror, pulse-driven motors or actuators for incident angle regulation are controlled.

3. The high precision posture control method of an X-ray mirror according to claim 2, wherein interference fringes resulting from the Fresnel mirrors are monitored by an imaging camera sensitive to target X-rays, an interference fringe at a smallest light collection spot is set as reference image data, and a detection signal is generated from a comparison between the reference image data and current sequential image data.

4. The high precision posture control method of an X-ray mirror according to claim 2, wherein interference fringes resulting from the Fresnel mirrors are monitored by an imaging camera sensitive to target X-rays, an interference fringe at a smallest light collection spot is set as reference image data, a change in sequential image data is detected with respect to the reference image data, and a pulse signal for driving the motors or actuators is generated until the sequential image data conforms to the reference image data in an allowable range.

5. The high precision posture control method of an X-ray according to claim 4, wherein the imaging camera is a CCD camera.

6. The high precision posture control method of an X-ray mirror according to claim 4, wherein the imaging camera is an X-ray detector with a combination of a pinhole and a photo diode.

7. A high precision posture control method of an X-ray mirror for collecting X-rays, from hard X-rays to soft X-rays, or changing a light path thereof by reflecting the X-rays on a strip-shaped reflective surface zone, said method comprising steps of: providing a pair of planar reflective surfaces constituting a Fresnel mirror in the vicinities of an incident-side end and an outgoing-side end of the reflective surface zone in the X-ray mirror; monitoring an interference fringe resulting from the Fresnel mirror at a position which is not influenced by X-ray beams reflected on the reflective surface zone; electrically detecting a change in the interference fringe; and using a detection signal as a feedback signal for posture control of the X-ray mirror.

8. An X-ray mirror that allows high precision posture control for collecting X-rays, from hard X-rays to soft X-rays, or changing a light path thereof by reflecting the X-rays, wherein a strip-shaped reflective surface zone is formed in a longitudinal direction, and a pair of planar reflective surfaces which can generate an interference fringe constitutes a Fresnel mirror in the vicinities of an incident-side end and an outgoing-side end of the reflective surface zone.

9. The high precision posture control method of an X-ray mirror according to claim 1, wherein interference fringes resulting from the Fresnel mirrors are monitored by an imaging camera sensitive to target X-rays, an interference fringe at a smallest light collection spot is set as reference image data, and a detection signal is generated from a comparison between the reference image data and current sequential image data.

10. The high precision posture control method of an X-ray according to claim 9, wherein the imaging camera is a CCD camera.

11. The high precision posture control method of an X-ray according to claim 3, wherein the imaging camera is a CCD camera.

12. The high precision posture control method of an X-ray mirror according to claim 9, wherein the imaging camera is an X-ray detector with a combination of a pinhole and a photo diode.

13. The high precision posture control method of an X-ray mirror according to claim 3, wherein the imaging camera is an X-ray detector with a combination of a pinhole and a photo diode.

* * * * *